US011284604B1

(12) United States Patent
Zeldin

(10) Patent No.: US 11,284,604 B1
(45) Date of Patent: Mar. 29, 2022

(54) RADIO CONTROLLED DOG WASTE COLLECTION DEVICE

(71) Applicant: Yuri M. Zeldin, Boston, MA (US)

(72) Inventor: Yuri M. Zeldin, Boston, MA (US)

( * ) Notice: Subject to any disclaimer, the term of this patent is extended or adjusted under 35 U.S.C. 154(b) by 194 days.

(21) Appl. No.: 16/818,768

(22) Filed: Mar. 13, 2020

Related U.S. Application Data

(60) Provisional application No. 62/821,632, filed on Mar. 21, 2019.

(51) Int. Cl.
*A01K 29/00* (2006.01)
*A01K 27/00* (2006.01)
*A01K 23/00* (2006.01)

(52) U.S. Cl.
CPC .......... *A01K 27/003* (2013.01); *A01K 23/005* (2013.01)

(58) Field of Classification Search
CPC ... A01K 27/003; A01K 27/005; E01H 1/1206
USPC .......................................................... 294/1.3
See application file for complete search history.

(56) References Cited

U.S. PATENT DOCUMENTS

| | | | |
|---|---|---|---|
| 2,473,647 A * | 6/1949 | Hulstedt | F23J 1/04 294/53.5 |
| 3,659,888 A * | 5/1972 | Dreier | A01B 1/02 294/49 |
| 3,744,453 A | 7/1973 | Deitch | |
| 3,937,509 A | 2/1976 | Hufnagel | |
| 4,135,750 A | 1/1979 | Rosin | |
| 4,641,873 A * | 2/1987 | Nurnberger | E01H 1/1206 294/1.4 |
| 4,966,400 A | 10/1990 | Hull et al. | |
| 5,103,771 A * | 4/1992 | Lee | A01K 27/005 119/776 |
| 5,203,598 A | 4/1993 | Lindlbauer | |
| 5,595,143 A | 1/1997 | Alberti | |
| 5,762,029 A | 6/1998 | DuBois et al. | |
| 6,113,166 A | 9/2000 | Wynn | |
| 6,164,710 A | 12/2000 | Shibuya | |
| 6,439,168 B1 | 8/2002 | Maglich et al. | |
| 6,926,149 B2 | 8/2005 | Tippey | |
| 6,971,334 B1 | 12/2005 | Livesay et al. | |
| 7,090,268 B2 | 8/2006 | Borman | |
| 7,267,381 B2 | 9/2007 | Cafferty et al. | |
| 7,367,286 B2 | 5/2008 | Beaupre | |
| 7,862,094 B1 | 1/2011 | Lamont et al. | |
| 7,931,170 B2 | 4/2011 | Che | |
| 7,938,086 B2 | 5/2011 | Cobb et al. | |

(Continued)

*Primary Examiner* — Paul T Chin
(74) *Attorney, Agent, or Firm* — Bardmesser Law Group

(57) ABSTRACT

A canine feces catching device for removal of excrement includes a leash that includes an extendable cord; a radio controller within the leash for control of the feces catching device; a button on the leash for operation of the radio controller; a moving element that moves along the cord in response to a signal from the radio controller; a platform formed as either as a widened part of the extendable cord or as a separate wider element supported by the leash; the moving element including a collecting device supported by the platform and configured to move along the platform and to stop at a predetermined location; a soft insert for the collecting device; a movement stopper that limits movement of the device along the platform; and a guiding rod for positioning the collecting device on the platform in a forward or backward direction.

12 Claims, 12 Drawing Sheets

(56) References Cited

U.S. PATENT DOCUMENTS

| | | | |
|---|---|---|---|
| 8,292,338 B1 | 10/2012 | Baghdasaryan | |
| 10,370,809 B1 * | 8/2019 | Samen | E01H 1/1206 |
| 2004/0124646 A1 * | 7/2004 | Peko | A01K 23/005 |
| | | | 294/1.4 |
| 2004/0145196 A1 | 7/2004 | Katz | |
| 2004/0237906 A1 | 12/2004 | Waxman et al. | |
| 2008/0042456 A1 | 2/2008 | Patel | |
| 2008/0276883 A1 * | 11/2008 | Perez Tomas | A01K 27/006 |
| | | | 119/798 |
| 2009/0095225 A1 * | 4/2009 | O'Connell | E01H 1/1206 |
| | | | 119/161 |
| 2012/0024925 A1 | 2/2012 | Caldeira et al. | |
| 2012/0080894 A1 | 2/2012 | Williamson | |
| 2014/0327255 A1 | 11/2014 | McGill | |

\* cited by examiner

RADIO CONTROLLED DOG WASTE COLLECTION DEVICE

CROSS REFERENCE TO RELATED APPLICATIONS

This application is a non-provisional of U.S. Provisional Patent Application No. 62/821,632, filed on Mar. 21, 2019.

BACKGROUND OF THE INVENTION

Field of the Invention

The proposed invention relates to a safe method and device for capture and disposal of dog waste (feces). The method and device permits avoiding contact between the dog owner and the feces, while rapidly capturing the dog waste immediately after defecation, regardless of the distance between the dog and the owner, which is safe from a sanitation point of view.

Description of the Related Art

The average age of the American population is increasing, which brings significant changes in the lives, habits and traditions, especially among the people of older age. For example:
a) Grown-up children leave their parents' homes, and start their own families. The parents live without their children for longer periods of time.
b) Older people experience an ever-growing need for the presence of pets to take care of.
c) Dogs help maintain, and sometimes improve, their owners' health as well as their psychological state; pet owners spend more time in motion, as well as more time outdoors.
d) People with impaired vision require guide dogs.
e) Children develop in a more harmonious fashion in households that have pets.

The number of pets kept by private owners is constantly growing everywhere. For example, in the US, their number has grown from 68 million to 78 million from 2000 to 2015. Consequently, the problem of cleaning after the animals is becoming more acute. These problems remain unsolved, despite the fact that many methods of dog waste capture have been proposed over time.

Among currently used techniques, equipment, devices, methods, elements (many of which have been patented, see, e.g., US20120024925) there is no single device that would completely satisfy every condition for the capturing and disposal of dog waste listed below:
  sanitary safety of the dog owner;
  feces left behind on the ground surface;
  virtually immediate reaction to the commencement of defecation process;
  ability to operate from any distance to the owner (depending on the leash length, up to 30 feet);
  no impediment to the dog's freedom of movement;
  no need to clean up the surface onto which the dog defecated;
  provision for the ease of the entire dog excrement capture operation;
  relatively low cost of capture and disposal, see U.S. Pat. No. 5,203,598; US 2012/0080894;
  the device cannot be cumbersome or inconvenient to use, see US 2012/0080894;
  the majority of known devices for collection of dog waste involve the use of owners' hands.

Often, people do not clean up after their dogs, for any number of reasons. For example: they are old, sick, have back or knee problems, they are standing on slippery surfaces, the clean-up process being an unpleasant one in most cases (due to appearance and smell).

Feces left on the ground in public places contain germs and attract insects; this can lead to increase in diseases and viruses. Sometimes people step into the feces and carry it to their homes or other locations, and the waste looks ugly.

Many countries employ radical methods of dealing with dog waste. Few things irritate people as much as the dog feces left behind; in England alone the daily volume of dog feces comes to 1,000 tons, in the US it is estimated to be about eight times that much. Failure to clean after the dogs is anti-social, smelly, and disease-spreading (such as toxocariasis). Dog mess is one of the most common complaints to local authorities.

There are volunteers who remove dog waste and bags left behind. In order to deal with this reality, some local authorities have proposed "poovers"—vacuum cleaners of dogs' waste. Sometimes, an ultimate solution is used: simply banning dogs. Many beach communities have implemented timed dog bans, where walking a dog at these places is banned during the day, or summer months.

Another approach offers rewards and incentives. Dog walking is allowed only in specially marked locations. In some places, the excrement was painted in bright green, orange or pink colors (the owners get the message that this is disgusting). In England, it has reached a point where people had decorated trees with dozens of poo-filled plastic bags in order to highlight the problem of owners not picking up the waste. In Spain, for example, volunteers were enlisted to look out for irresponsible owners; a 70% reduction in the volume of waste left in the streets was reported. In England, plain-clothed officers and even surveillance vans were used to enable on-the-spot issuance of fines to irresponsible owners.

"A dog DNA database could quickly solve the problem" (a suggestion by the Isle of Wright's Council). Dogs had been banned for many years in the Icelandic capital of Reykjavik and other urban areas amid fear of disease. Use of pictures of staring eyes on signs to warn people to clean up is another possibility.

Many devices for dog waste collection are known, see, e.g., see U.S. Pat. Nos. 7,267,381, 6,164,710, 4,966,400, 3,937,509, 3,744,153, US 20140327255 A1, US 20040145196 A1, U.S. Pat. Nos. 6,926,149, 7,367,286, US 20050002630, U.S. Pat. Nos. 4,135,750, 3,744,453, 4,966, 400, 6,113,166, 5,595,143, 5,762,029, US 20080042456, US 20120080894, US 20040237906 A1, U.S. Pat. Nos. 6,439, 168, 6,971,334, 7,938,086, 7,862,094, 8,292,338, 8,911,936, 7,931,170 B2, U.S. Pat. Nos. 7,090,268, 3,681,088. However, none of these known devices fully address all of the problems facing the dog owner.

SUMMARY OF THE INVENTION

Accordingly, the present invention is directed to a dog feces collection device, that substantially obviates one or more of the disadvantages of the related art.

In one aspect of the invention, a canine feces catching device for removal of excrement includes a leash that includes an extendable cord; a radio controller within the leash for control of the feces catching device; a button on the leash for operation of the radio controller; a moving element that moves along the cord in response to a signal from the radio controller; a platform formed as either as a widened part of the extendable cord or as a separate wider element supported by the leash; the moving element including a collecting device supported by the platform and configured to move along the platform and to stop at a predetermined location; a soft insert for the collecting device; a movement stopper that limits movement of the device along the platform; and a guiding rod for positioning the collecting device on the platform in a forward or backward direction.

Optionally, soft inserts are used to support the collecting device on the platform. Optionally, collecting device is a round or rectangular-shaped "catcher" made of plastic. Optionally, a coaster element having the same shape as the collecting device and inserted into the collecting device. Optionally, a lid is attachable to the collecting device. Optionally, a tying cord is inserted along a circumference of a top of the collecting device. Optionally, coil releases the cord or a soft wire (string) that move the collecting device in response to the radio signal. Optionally, the leash and the collector are lowered to the ground in response to the same command. Optionally, the collecting device moves forward only once the leash touches the ground in a location where the collecting device is located. Optionally, the collecting device is always located above the cord and moves only along the central axis of the cord. Optionally, the cord is connected to a harness of the dog. Optionally, at least the inserts used in the collecting device are made from a biodegradable material. Optionally, the collecting device stops movement along the guiding rod once the limiter is reached.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 12:
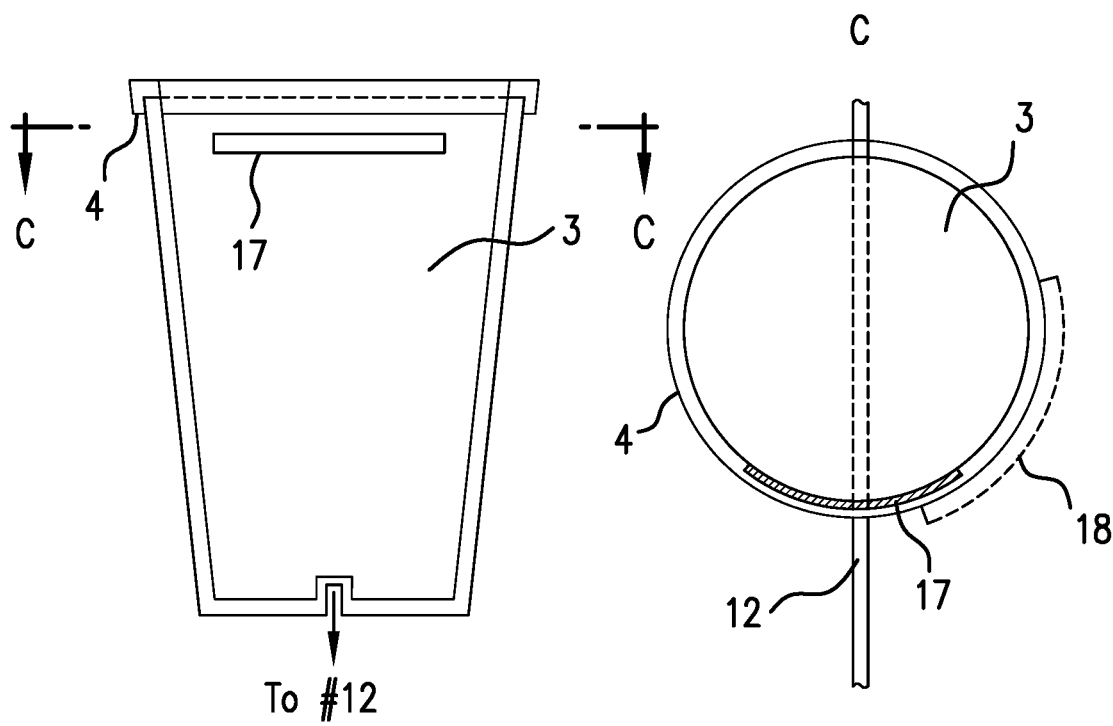

FIG. 12 includes the front view as well as a c-c section of an improved (as well as more expensive and reliable) waste collector.

Figure 13:
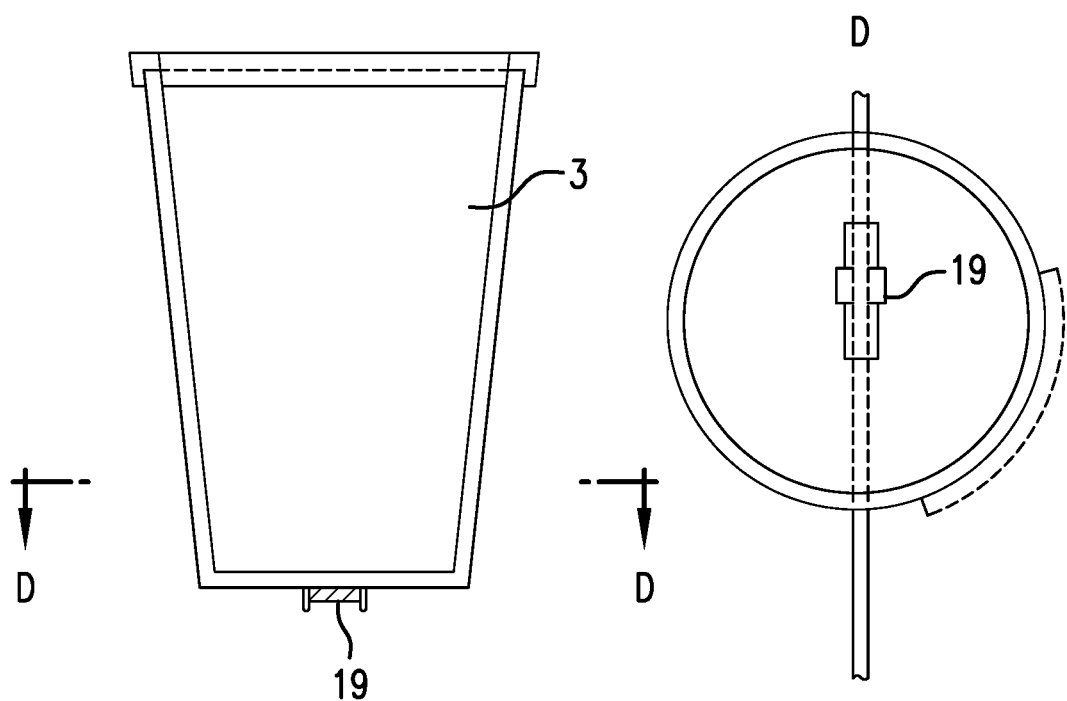

FIG. 13 is comprised of two parts: front view of the collector complete with waste receiving device attached (or manufactured as one) placed from above on the guiding rod.

DETAILED DESCRIPTION OF THE PREFERRED EMBODIMENTS

Reference will now be made in detail to the preferred embodiments of the present invention, examples of which are illustrated in the accompanying drawings.

According to one embodiment of the invention, the following are the advantages of the invention:
 the waste to be disposed without the owner coming into contact with it;
 the device to require no cleaning (washing) before subsequent to use;
 guarantee of the ability to clean a surface from dog waste without contamination;
 ability to prevent the dog from coming into contact with its feces;
 suitability of the device (method, technique) for a pet of any size (mainly—any height);
 practically instantaneous isolation (encapsulation) of the feces post-defecation;
 ensuring the dog owner can remain on a flat, safe surface (dry, free from snow, ice, not slippery) during the dog's defecation process;
 dog owner does not need to carry devices, bags, chemicals, scoops, etc;
 radio signal remote controller is located on the handle of the leash;
 the dog owner can properly position the capturing device at any moment in time, regardless of their distance to the animal;
 the proposed device (invention) stimulates the dog owner to spend more time outdoors, if the device does not create any inconveniences;
 the device does not take up much additional space;
 no additional actions are required prior to taking the dog for a walk;
 the proposed device adds only several simple elements to the harness or leash;

The device of the present invention allows the owner to avoid having to bend over while picking up the animal's feces. The method of using the device is safe.

In one embodiment, the dog excrement collecting device includes the following components: a leash, widened in the area of placement of the waste collector, pusher or platform (not required for small animals); a platform widened in the area close to the animal providing for balancing of the overall system with the suspended leash; a radio-controlled or non-moving waste collector, a pusher (for one of the device's versions); handle complete with the remote control mechanism to enable movement back and forth; collector movement limiter (stopper); and leash length extension or shortening regulator button.

When the animal is ready to defecate, its owner lowers the leash to the ground as soon as possible and activates the radio-controlled (RC) device (radio-controlled system immediately assumes the position required for dog waste collection). At the end of the entire procedure, the radio-controlled device moves in the opposite direction (away from the animal), the leash lifts up from the ground, its length shortens, the dog owner encapsulates the collector to either leave it on the leash or empty it into a garbage can.

The following reference numbers are used in the figures:
1. Dog.
2. Device (moving part).
3. Feces collector.
4. Soft part of collector (one out of several types).
5. Platform (separate of part of leash).
6. Leash with a variable length or without it.
6'. Widened part of the leash.
7. Leash handle.
8. Button (for the leash).
9. Supporting elements.
10. Button (for the device).
11. Barriers, or platform limiters.
12. Guiding rod.
13. Part of harness.
14. Part of the device connecting harness and leash.
15. Tail.
16. Ground level.
17. Magnets or Velcro.
18. Feces collector lid.
19. Device connecting the waste collector to the leash or platform.
20. Insert seals.

Figure 1:
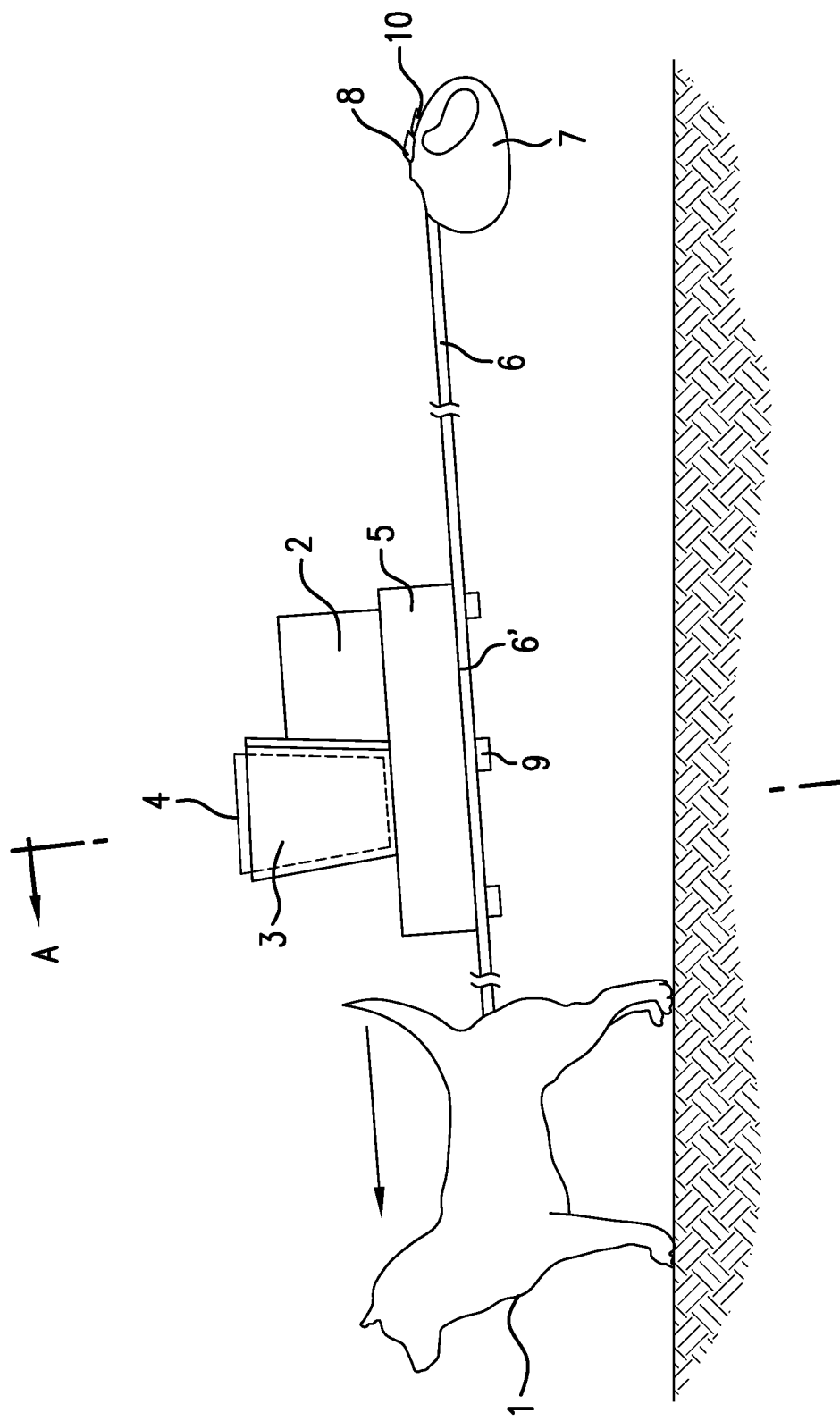
FIG. 1 is a front view of the device showing the leash onto which the feces receiving device is mounted, including a part of the entire device, with the waste collector above the platform.

FIG. 1 is a front view of the device, showing the leash onto which the feces receiving device is mounted, including a part of the entire device. Note that in the interest of clarity, the device is shown not to scale compared to the dog—in reality, the device is much smaller, relative to the dog, than it appears in the figures. The receiving device can be of a round, square or rectangular shape. The last one is elongated in the direction perpendicular to the leash. A coaster is inserted into the receiving device.

Figure 2:
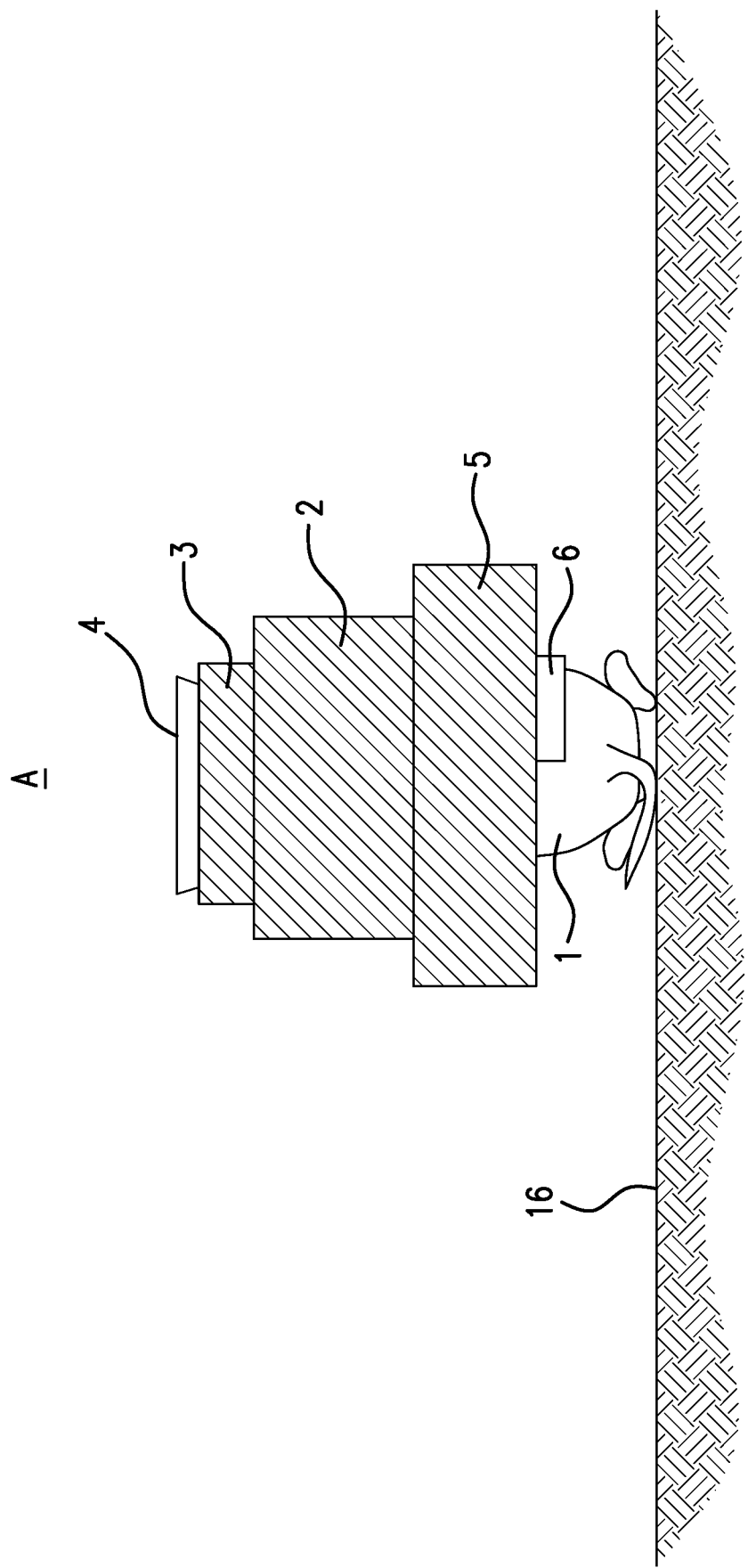
FIG. 2 is a transverse section of the feces catching device (perpendicular to the length of the leash), from which it follows that the coaster repeats the receiving device's shape.

FIG. 2 is a transverse section of the feces catching device (viewed in cross section perpendicular to the length of the leash), from which it follows that the coaster repeats the receiving device's shape. In addition to the standard form, the waste catcher can be manufactured from a variety of materials, be mounted to the elements situated lower in several ways (to the leash, platform, the radio-controlled part of the device, protrusion/bulge and so on.) Selection of the mounting method may affect the overall cost of the device. Part of the device from the left barrier is tightly tied to the harness.

Figure 3:
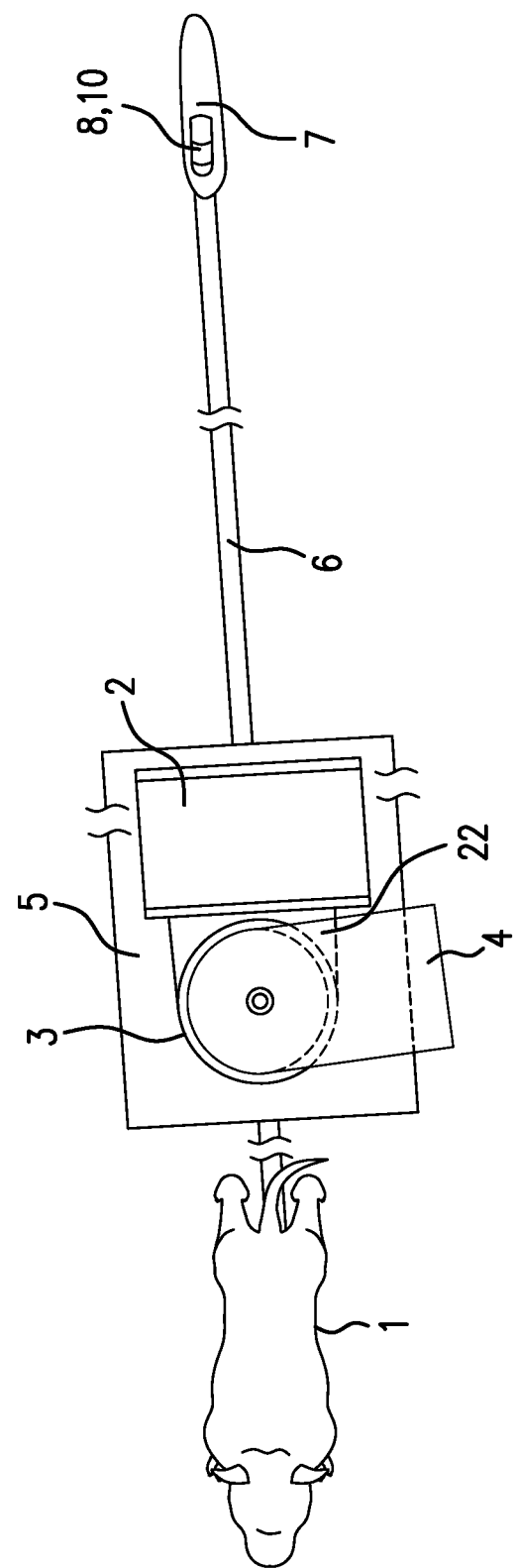
FIG. 3 is a plan view of the device from above.

FIG. 3 is a plan view of the device from above. The receiving device is intended not only for the collection of dog waste, but also for protection of the waste from rain, wind, snow, etc. The receiving device has to be able to change location (move) in two directions within short limits (along the leash), which would allow the animal's owner to rapidly react to the commencement of the defecation process. The initial position of the feces receiver is partially dictated by the animal's size and the harness to which the leash is attached.

Figure 4:
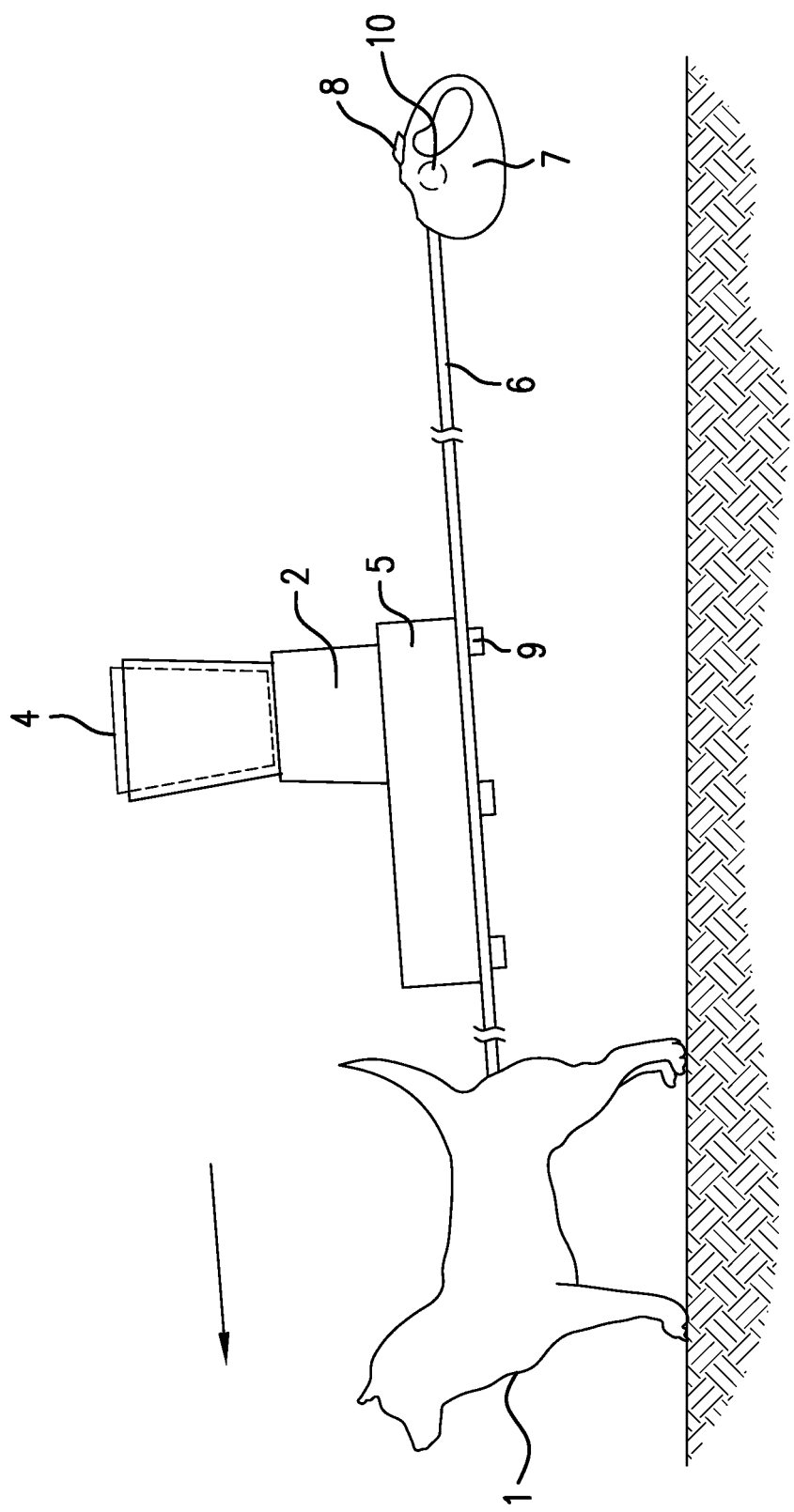
FIG. 4 is a side view of the entire dog waste catching system, which is on top of the remote controlled part.

FIG. 4 is a side view of the entire dog waste catching system. In this case, it includes the leash with the controller handle, into which the leash shortening and extension button is built; a lining to prevent the leash from the influence of residues (partial) of materials and objects capable of causing damage to the leash when it finds itself on the ground surface; the platform movable along the surface of the leash; element (radio-controlled) located on the platform; dog waste receiver complete with a soft insert (single use), this set-up differs from FIGS. 1, 2, 3 because the waste receiver is located directly above the RC movable element, while in FIGS. 1, 2, 3, the waste receiver is located in front of the movable element.

Figure 5:
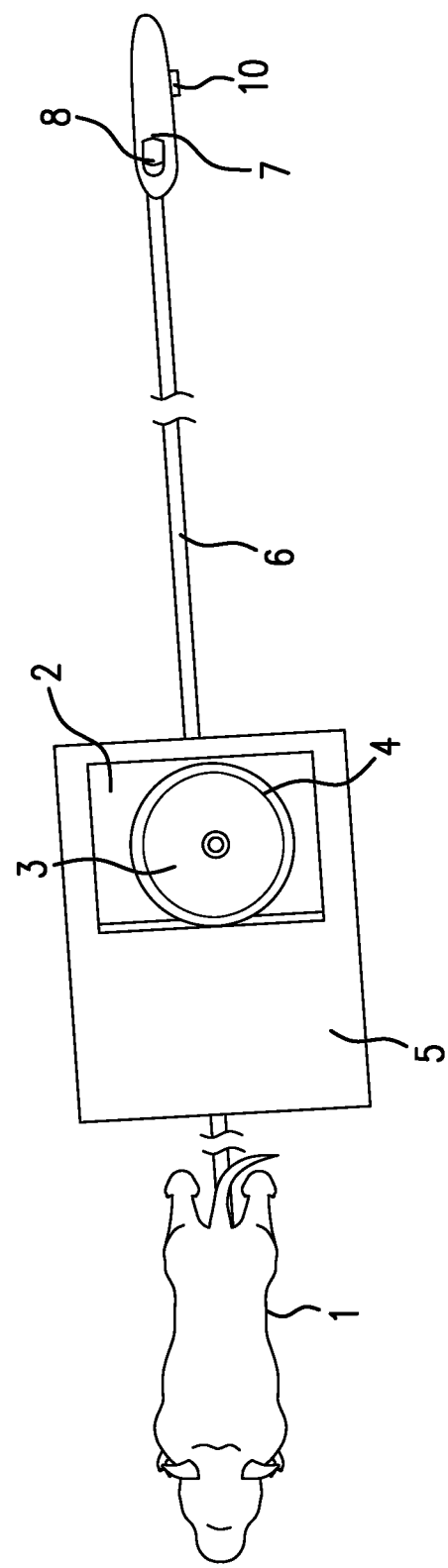
FIG. 5 is the top view of the device of FIG. 4.

FIG. 5 is a top view of the device that is shown in FIG. 4. It follows from the schematic that the waste receiver is connected, via the radio-controlled platform with the widened part of the leash to ensure stability of the entire system while it is suspended at some distance from the ground surface. This widened part is manufactured from the same material as the leash itself. It is desirable that the widened platform's angles be rounded.

Figure 6:
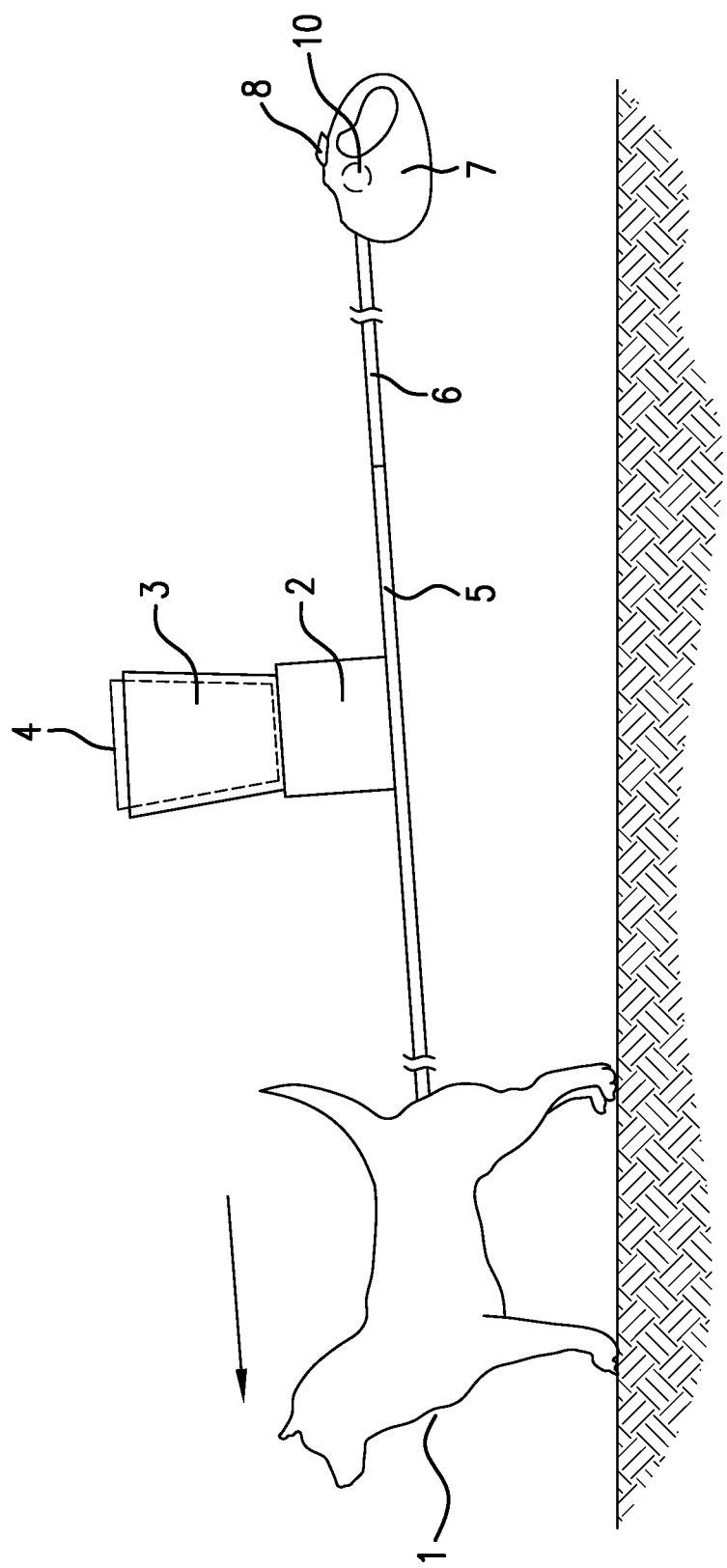
FIG. 6 is a side view of the entire dog waste catching system without the platform.

FIG. 6 is a side view of the entire dog waste catching system. In this case there is no movable separate platform, which makes the schematic different from the one depicted in FIG. 1. The device is attached to the extended part of the platform.

Figure 7:
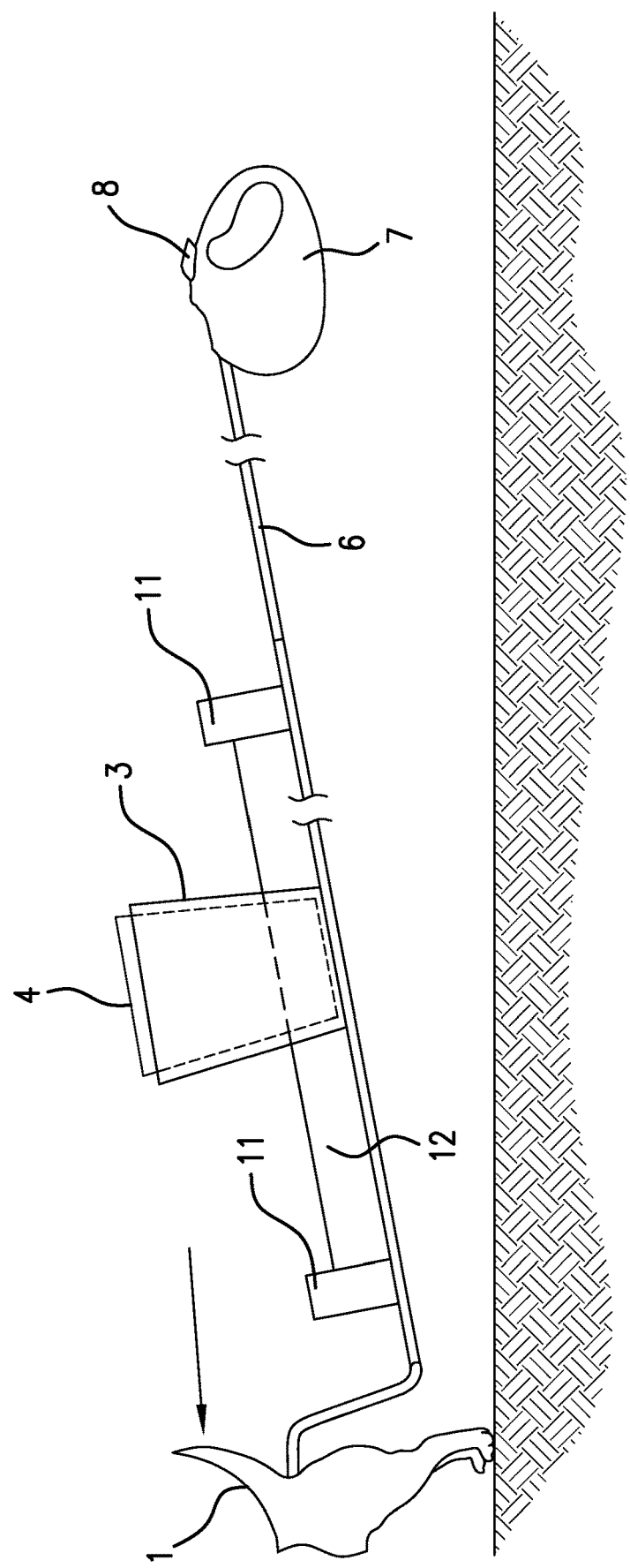
FIG. 7 is a side view of the device without a radio-controlled (RC) element in this set-up.

FIG. 7 is a side view of the device. There is no radio-controlled (RC) element in this set-up. This method is acceptable for small dogs (maximum 18" tall). It does not contain radio-controlled parts. The waste catcher rests against the widened platform; barriers (limiters or stoppers), manufactured from the same material as the leash, which stop the receiving device's movements on a short segment of the leash are located in front and past the platform; the catching device itself rests on the guiding rod (the guiding object), and a straight element (rod) several millimeters high. This device uses the least number of parts compared to other devices described herein.

Figure 8:
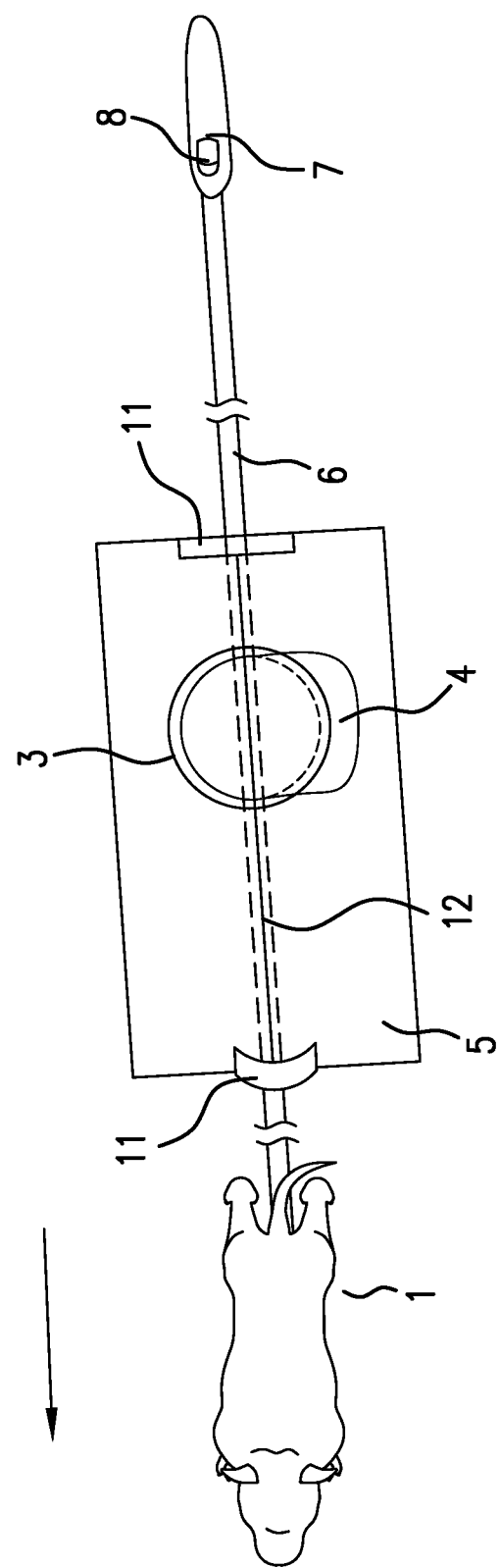
FIG. 8 is a view of the device from above (see FIG. 7).

FIG. 8 is a view of the device from above (FIG. 7).

The leash has a standard form along most of its length, with the exception of its last section, several inches long (the length mainly depends on the animal's/dog's size). This short segment near the dog gradually transforms into the vertical part of the leash that has been shifted off the entire system's central axis in order to ensure an easier, simple and quick adaptation of the system to its objective: the feces collecting part must be positioned in a strictly defined spot at the time of the defecation process. This spot is determined prior to taking the dog outdoors. Apart from the leash-length controlling button, its clamping and release, the leash handle box also has a built-in signal-sending device, by the dog's owner, for the movable part of the system (device). The control button for the aforementioned device is located on the handle's surface. In some cases, when dealing with small-sized or miniature dogs, radio control is not required, because given the very short leash and its small cross-section, it is possible to catch the feces via independent movement of the device in dog's direction. The widened part of the leash depends on the overall length of the leash. A leash of greater length is almost always positioned at different angles in relation to the horizontal. This angle changes often depending on the animal's command. The widened part of the leash is designed mainly to prevent the leash from tipping over to the left or right off vertical axis.

The radio-controlled (RC) element receives the sensor signal and as a result the feces retrieving part almost instantaneously assumes the previously prepared spot (position).

Depending on its location on the leash, the platform represents a square or rectangular, thin and simple construct of minimal possible weight, yet from the other point of view, the platform plays a certain role in keeping the device in balance when the entire system is in a suspended state (when the animal is moving).

The movable part has several elements, attached to the leash and moving along the leash's axis, while the leash is in suspended state or exclusively along the horizontal when the leash is on the ground. With the exception of miniature and small dogs, the feces retriever moves on a relatively long leash, which provides additional freedom to the animal. For miniature and small dogs (taking into account their height) the feces retriever takes up its final position by moving down under its own weight along the leash. At the same time, it is allowable to increase the retrieving element's weight in order to speed the movement up. The leash for miniature and small dogs can be without a handle (and its built-in button).

The collector can be protected from outside influences by plastic parts. The device can move along the leash under some tension in order to prevent its slipping into the final position before activation of the radio-controlled signal. This condition is not typically used for miniature and small-sized dogs. For animals (dogs) of miniature and small sizes, the use of laces or strings for movement of collector into its final position can be employed.

The radio signal receiver is typically of a small height of 0.5-1 inches, which allows for the overall device height reduction and device placement under the dog's body regardless of the dog's size. The leash and the collecting device can be operated independently or upon the same command.

The dog wears a harness, which is connected to the leash and splits off in order to provide more freedom of movement in any direction to the dog. At the same time the entire device, including part of leash located near the animal: feces retriever, harness, acquires additional rigidity without introduction of other elements.

The barrier or limiters are made of the same material as the widened part of the leash, located near the animal (from behind). Barriers (or limiters) can move along the leash or platform and be attached to them by various methods. One barrier located on the side of the leash control handle can be placed on various spots along the leash, while the second barrier is attached to a strictly determined position.

Supporting elements located on the lower part of the leash, or, when the leash is of widened size, then at the ends of this widened element. The supporting elements provide additional stability for feces retriever, allow the leash to remain in the same condition (not to tip over) and, finally, protect the leash from getting dirty and wet when the leash lies on the ground along with the device attached thereto.

The feces retriever that is pushed from behind has a lower height than the one located on the moving RC-signal receiving platform. However, a retriever on a platform is of more reliable construction, the proposed device takes up less space; is easier to operate and the entire construction is simplified. Such a direct catchment of feces guarantees non-propagation of illnesses (transmitting of deceases) and non-contamination of water supply.

Figure 9:
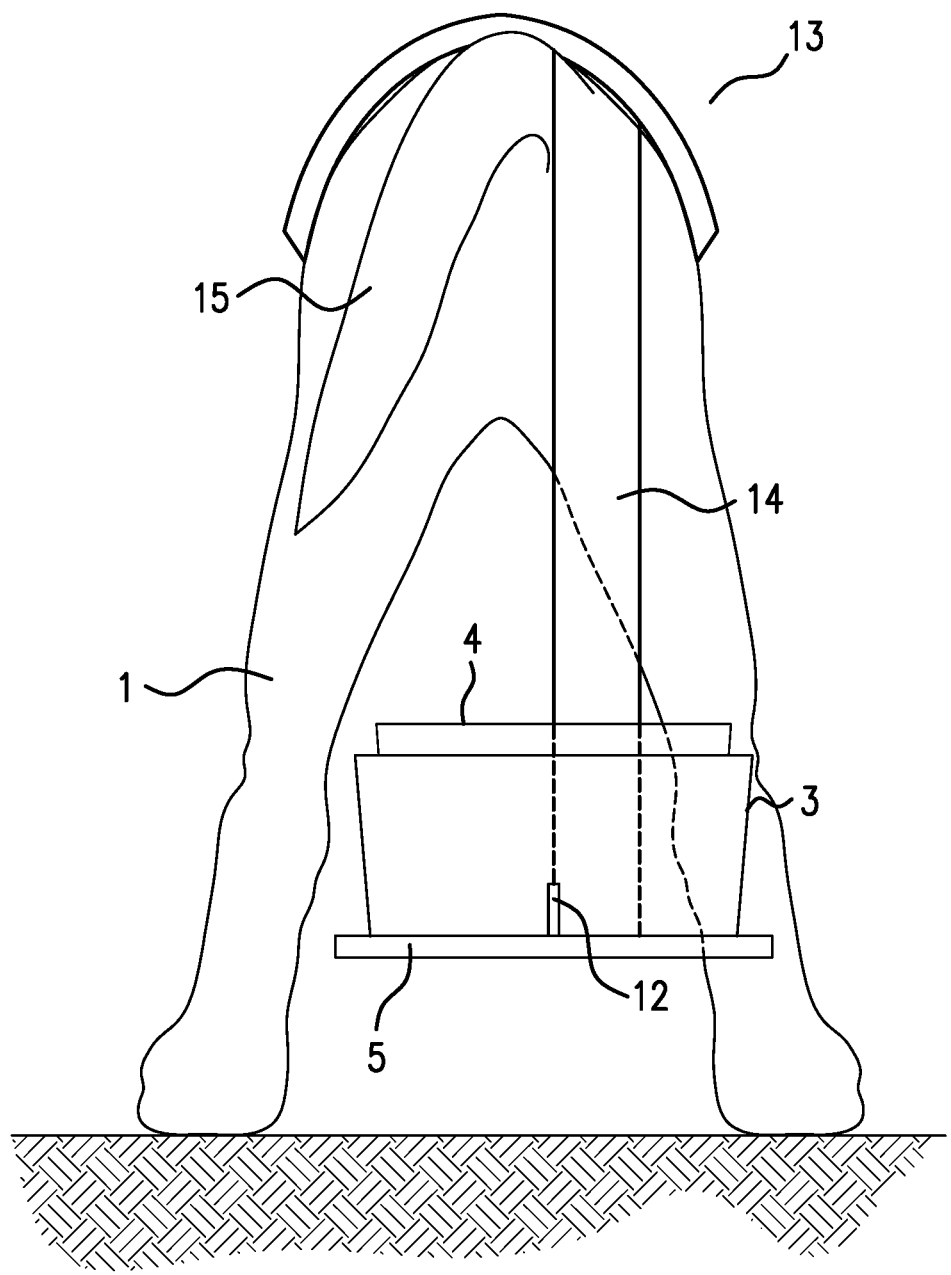
FIG. 9 is the rear view of the device (see FIG. 7) without the RC part.

FIG. 9 is the rear view of the device (FIG. 7) without the RC part.

Figure 10:
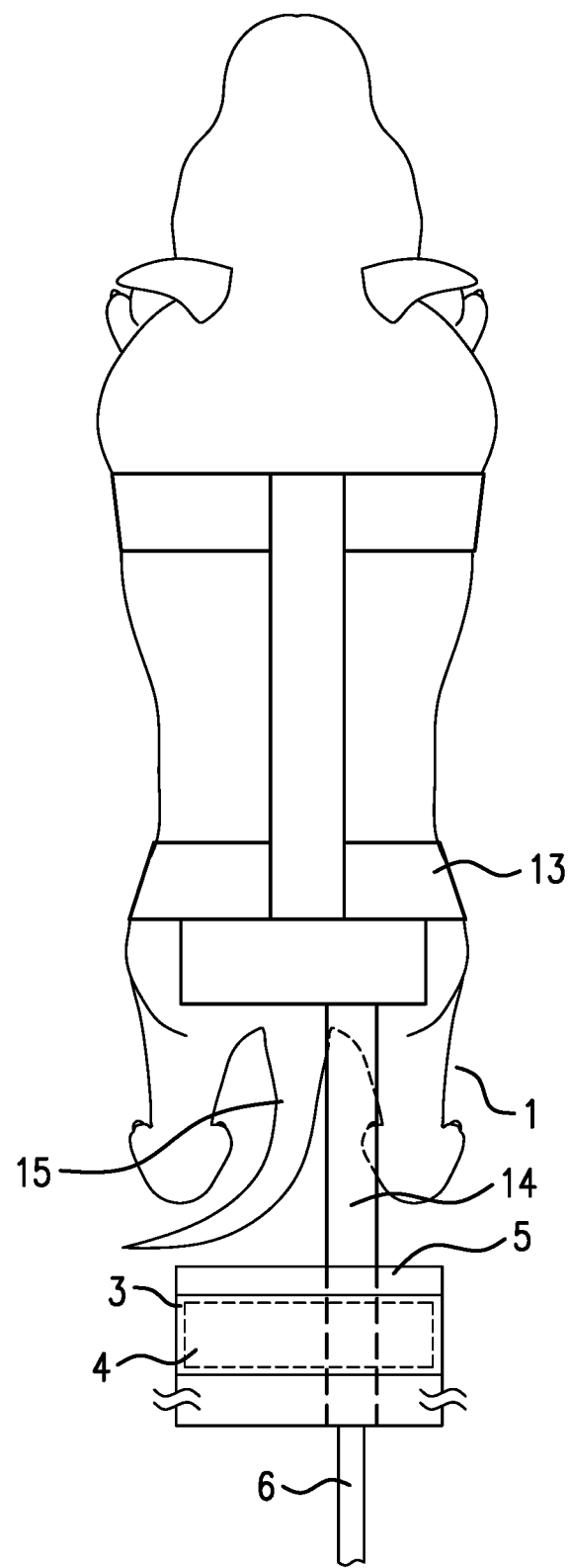
FIG. 10 is the view from above (altered harness).

FIG. 10 is the view from above (showing an altered harness). The points in which additional elements should be (as proposed) are indicated. These elements provide for the ability to adapt the harness to animals of different sizes.

Figure 11:
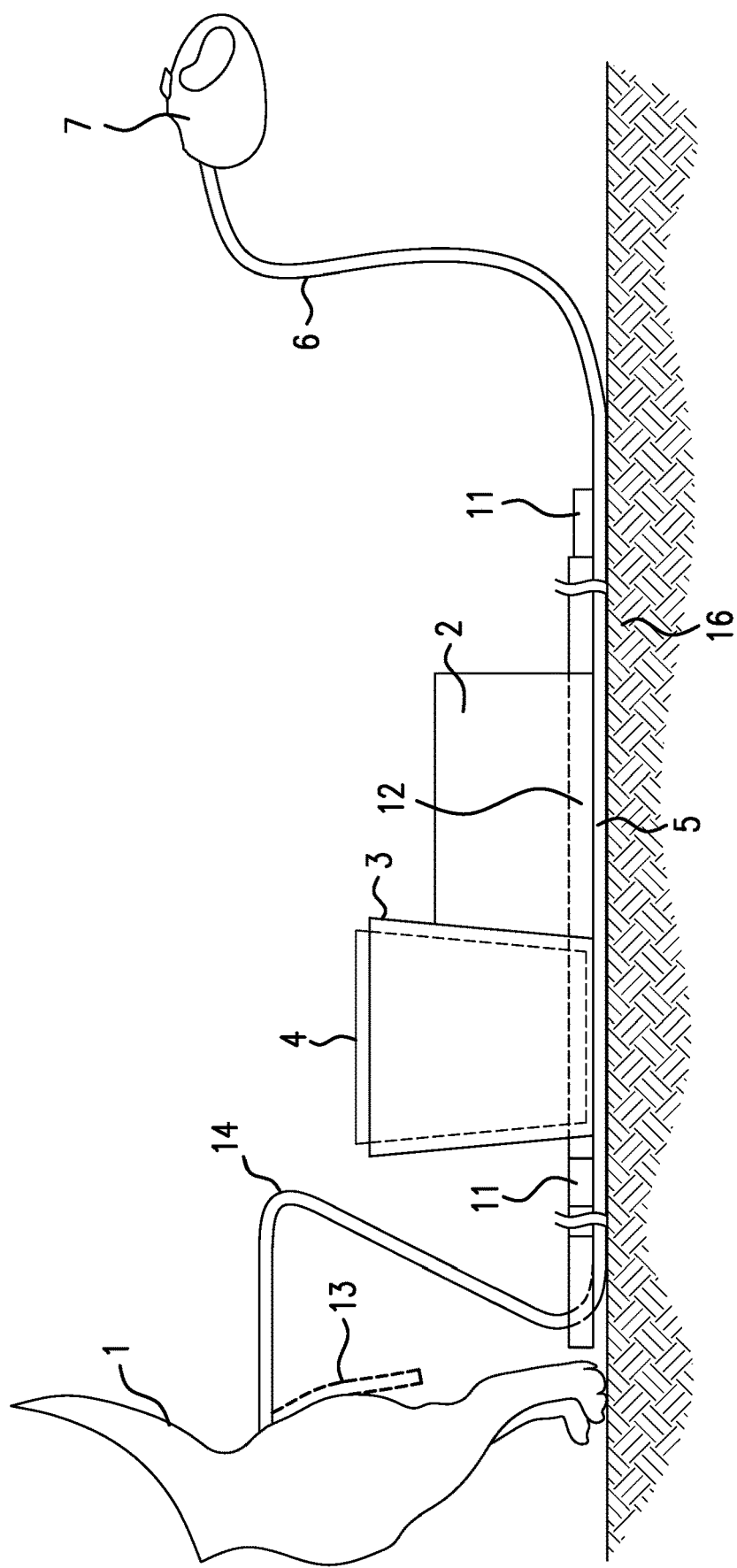
FIG. 11 shows a side view of the waste catching device in working position, located between the dog's hind legs.

FIG. 11 shows a side view of the waste catching device in a working position, located between the dog's hind legs; the leash is located on the ground in a free (not tensioned) state. The waste collector is resting against a stopper that does not allow it to bypass a previously determined stopping place (dislocation). The radio-controlled element is located behind the collecting element—one of the possible variants, according to the schematics described above.

FIG. 12 includes the front view as well as a section across C-C of an improved (as well potentially as more expensive and reliable) waste collector. The schematic shows a method of isolation of the waste collector (magnets) and the guiding rod in order to move the waste collector in a straight line in the animal's direction.

FIG. 13 is comprised of two parts: a front view of the collector complete with waste receiving device attached (or manufactured as one) placed from above on the guiding rod, and a cross-sectional view across D-D.

All waste disposal options are shown on the figures.

Based on FIG. 1 (not to scale), the proposed invention represents a certain horizontal or vertical construct that can be implemented in several variants, depending on convenience of its use, cost and technical equipment. In FIG. 1 the waste collector is located in front of the movable part of the device, which makes this variant different from all others. The waste collector (3) and (4) is attached to the surface of the platform (5).

The platform (5), in turn, is manufactured long enough and wide enough to fit the following on it: device's movable part (2), and the animal waste receiving device (3), (4) to collect the waste. The shaded area in FIG. 2, designated by (3), indicates the need for a seal element to be located in front of the movable part (2) in order to prevent shifting of the receiving device (3) during the movement of the entire device forward.

For the version depicted in FIG. 1, 2, 3, the leash (6) has a widened part below the platform (5) only, although in order to ensure balancing of the entire system when the leash (6) is in a raised position, the width and length of the leash (6) must be increased. This increase is dictated by the standard width of the leash as well as by which method is used to attach the receiving device and the movable device to the leash.

The leash handle (7) which has the buttons (8) and (10) is constantly placed in the dog owner's (user's) hands. When the animal is ready to defecate, the receiving device (3) is put into motion with the help of the command button (10), although some situations call for the use of both buttons (8) and (10).

This depends on the leash tension and its distance from the ground surface. At the same time, the distance from the device (its front part) (3) to the spot where the receiving device stops, should not exceed several inches. The supporting elements (9) are manufactured from the same material as the leash. Velcro can be used to attach them to the leash (6) prior to starting the dog walk.

The leash length (6), its cross-section, and consequently some of details of the device (the movable part) (2) depend mainly on the dog's (1) size in direct proportion: the larger the dog (1) size, the longer the leash (6).

In the majority of cases, the barrier or platform limiter (11) should be attached in front of the waste collector (3). This removes the danger of the collector shifting past the designated stopping spot when the dog moves to the side.

The barrier or platform limiter (11) should also be attached behind the movable element of the device because the waste collector (3) moves back along the leash for the length of the widened part of the platform (5).

The device element (5) is made from the same material as the leash (6), which helps lower the cost of entire invention. It is considered acceptable to maintain this condition with respect to the supporting elements (9) as well.

It is sometimes preferable to "stretch" the flexible part of the waste collector (the coaster-type) to the left or to the right of the central axis of the leash (6). This creates better situations for the capturing of feces, especially for the dogs of medium and large sizes. Although this variant results in some cost increase of the device on the account of the required change of its shape and size as well as additional complications in isolating the feces post-defecation. Besides this, the regular (round) coasters become unsuitable with this variant of the stretched soft part of the waste collector.

The platform (5) can be shorter in those cases where the radio-controlled (2) waste collector (3), (4) is located on the front part of the device because there is no pushing element (2). In this case, there is also no need for the seal elements (22).

FIG. 4 shows that when the waste collector is placed on the surface of the moving element (2), the overall height of the construct is increased. This fact is not significant, taking into account that in reality the controllable device (2) rises above the surface of the widened part of the leash at a maximum by 1-1.5 inches. The size of the entire device can be shrunk with the advancements in sensor engineering and technology, FIG. 4, items (2), (3).

Referring to FIG. 4, the present invention relates to the leash handle (7) where it is proposed that the variant with only one button to control the device (10) is preferred. In this case, the animal's owner can draw the device into the final position when the device rests against the barrier (11) (or platform limit). The final position is reached when elements (2) and (4), FIG. 4, while positioned vertically one on top of the other, somewhat fail to reach the hind legs of the dog. It should be noted that it is desirable to set the barrier (11) more or less exactly on the leash (6) prior to taking the dog for a walk, this would practically guarantee feces dropping into the receiving member (3).

Referring to FIG. 5, the present invention relates to a substance retrieval device. The substance may be coagulated or it can be in liquid form. Of course, it would be preferable (as the entire process is shortened) to make the suspended part of the device (2) move in the dog's direction with the use of only one control button (10). Such action may not have to do with the extension or shortening of the leash (6) because disposal of the feces is done by various methods once the feces has been placed into the waste collector (3).

While walking the dog, its owner (or member of the owner's family) affixes the device movable parts ((3), (4), (5)) onto the leash (6) (barrier not shown). The moment the dog is ready to defecate, taking several seconds to adapt to the process, the dog owner presses the leash handle button (10). As a result of this action, the device moves forward and takes the final position (FIG. 8), pos. (2), (3), (4), (5). In order to reduce the amount of time required for capturing of feces, it is recommended to locate the device 4"-6" from the barrier (11) ahead of time, prior to taking the animal out for a walk.

The animal typically searches for a convenient position for defecation, and it depends on the type of ground surface, obstacles located on it, time of year, dog's (1) condition, etc.

When the waste collector (4) is placed on the part of the device that received the electronic signal for moving the waste collector forward (2), there is practically no difference with the system described above (FIG. 4).

Referring to FIG. 5, it can be observed that the leash has been lowered in relation to the animal's (1) longitudinal central axis. The requirement for such displacement shall be explained in the following diagrams (FIGS. 9, 10).

Regarding FIG. 7—the controllable device is not shown, while the dog feces end up in the soft part of the collector (4) that is inserted into a multiple use container (3). The container moves down along the guiding rod, at the same time the leash is positioned at a slight angle in relation to ground surface. The animal's owner regulates the angle, at the same time the owner's height dictates the angle for small and miniature dogs. Obviously, in such cases, the leash itself has to be much shorter. The leash is shifted away from the dog's central longitudinal axis to the right or to the left, FIG. 9, 10, which requires, along with the guiding rod element, amendments in the bearing part of the waste collector (3).

Therefore, FIGS. 1, 2, 3 depict a widened leash (6') that also has a platform on it (5). The movable element (2) moves the feces collector forward at high speeds, upon receipt of RC signal.

FIGS. 4-6 depict the widened leash (6') that also has a platform on it (5), yet it is the movable element (2) itself that carries the feces collector.

FIGS. 7-9 depict no movable element (2), while the receiving device moves to its final position under its own weight by gliding over the guiding rod (12). The barriers (11) placed on the leash (6) at both sides from the widened platform (6'). Therefore, looking at FIG. 1-3, it is possible to make the following conclusions: the controllable movable element (2) moves the feces collector (3), (4) forward when the additional platform (5) is connected to the leash (6). This collector device stops at a predetermined spot, the signal to commence motion is provided by pushing the button (10) located on the control handle (7). At the same time the leash (6) quickly descends to the ground and as a result the entire construct ends up on a solid surface.

In all versions, the main condition for successful realization of the objective is the human factor—the reaction speed time of the person walking the dog, and not the mechanism's (device) performance. Based on a multitude of experience, this reaction speed can be improved, amongst the adults as well as the children of various ages. In this sense, people with poor eyesight will be presented with a certain degree of difficulty.

Once the objective is fulfilled, the device is moved away from the animal in the opposite direction for a short (several inches) distance with use of the same button (10) (or together with button (8), until it rests against the barrier (or platform limit). In order to simplify the device, it is possible to "sacrifice" the barrier as it has a limited influence on the process as a whole. The dog feces container is closed by the animal's owner, or automatically.

In a variant similar to that depicted in FIGS. 4-6, the device motion signal is applied by the same method as described above (using the remote RC), yet the entire system's (2) movable part is located directly under the waste collector (3), (4).

Regarding FIGS. 7-9, the absence of the movable part (2) and the platform (5) in the overall set up of the device (2) is dictated by the fact that the feces collector (3), (4) is moving at an angle towards the animal by itself (there is no RC). These device parts have been replaced by the guiding rod (12), along which freely glides the feces collector (3), (4).

FIG. 7 shows a side view of the device without the movable part operated by radio control (RC) principle. FIG. 8 shows the view of the device from the top, showing the system components that operate on short distance of platform (5), limited on both sides by barriers (11). The left barrier is located as close as possible to the hind legs of the animal so as not to interfere with the movement of the dog in any direction.

In real life the platform is placed almost all the way against the animal. At the same time, the leash is controlled by pushing button (8) only, located on the leash handle (7). FIG. 9 is the view from behind of the device without the RC system. As evident from the drawing, the element connecting the harness and the leash (14) has been shifted off the system's main axis in order to provide freedom of movement in any direction to the dog while it is in the process of defecating.

Regarding FIG. 10, it represents the view of FIG. 9 from above. The platform (5) has been shortened, element (14) transitions into the wide part of the harness (13), which partially changes the standard shape of the harness.

A miniature remote control (RC), located on a leash containing the widened platform should preferably be available to customers in the same harness and kit set. More preferably, the RC block+harness+leash system should be manufactured as an integrated, ready-for-use product.

FIG. 11 shows the side view of the device together with the part that moves the feces collector with the help of RC, which is recommended for medium and larger sized dogs.

As shown in FIG. 12, the feces receiving device (or waste collector) (3), complete with the soft insert (4) inside has a protrusion in its base. This protrusion is designed to latch the retrieving device on the guiding rod (12) (or the directional element). This construction is meant for small-sized or miniature dogs. The soft insert matches the retrieving device along its perimeter, without additional attachments.

If the retrieving device's lid (not shown on the drawing) is manufactured from thin metal, then a magnet (17) is used to close it and isolate the dog feces. It is preferable to replace metal with light plastic (18) and to use Velcro instead of magnet, as shown by section C-C, FIG. 12.

As shown in FIG. 13, it is allowable for the feces retrieving device (3) to "fit" on the guiding rod with the help of protrusion (19), see section D-D, FIG. 13.

The aesthetically isolated feces retriever's appearance is incomparably more attractive in comparison to what remains after the use of scoops, garments, bags to collect feces from the ground, or any of the flat materials—collecting sheets, or with what is left on the ground after use of freezing, dissolving, vacuuming, or if no method of clean-up was used at all.

The dog's owner does not have to bend down in order to pick up the feces retriever to collect/dispose of its contents, as is the case with the majority of other inventions. In this case, the device moves away from its terminal position (between the dog's hind legs) in the owner's direction along the leash axis, this movement takes place over a short distance of a few inches. Furthermore, the movement only takes place when the leash is raised at an angle to the horizontal. If desired, the dog's owner draws the retrieving device nearer while simultaneously raising it to a height convenient for the insert (coaster) removal. The second stopper does not have to be there.

The proposed device does not require expensive machinery or long time to manufacture. This fact allows for the device to be improved as a whole, or in part, without significant increase in cost. The main directions for additional modifications are:
a) Universal harness creation;
b) Increasing leash device stability once it is put on, during the dog walking process;
c) Use of the latest constructions and methods of remote distance electronic control;
d) Creation of more reliable leash and harness joining method, to ensure it follows the dog's movements in any direction and allows the feces retriever to be precisely positioned in a required spot at the right time.

Additionally, the non-transparent feces collector makes the feces invisible. The proposed device helps increase dog walkers' reaction, especially among children, because in most cases it only takes fractions of a second, or several seconds at the most, from the moment an animal becomes ready to defecate to feces retriever's placement between the dog's hind legs, or in close proximity to them.

The device leaves no dog feces on the ground, allowing the animal's owner not to have to worry about cleaning footwear as often is the case when other proposals-inventions are used (collecting of feces with the help of bags, scoops, collecting sheets, reprocessing methods, etc.). There is no need to clean any surface because dog feces end up directly in the feces retriever.

Statistics obtained by the invention's author based on actual field experience shows the device's success rate of 80%.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A canine feces catching device for removal of excrement, the device including:
a) a leash that includes an extendable cord;
b) a radio controller within the leash for control of the feces catching device;
c) a button on the leash for operation of the radio controller;
d) a moving element that moves a collecting device forward and backward in response to a signal from the radio controller;
e) a platform formed as either as a widened part of the extendable cord or as a separate wider element supported by the leash;
f) the collecting device being supported by the platform and configured to move along the platform and to stop at a predetermined location;
g) a soft insert for the collecting device;
h) a movement stopper that limits movement of the device along the platform; and
i) a guiding rod for positioning the collecting device on the platform in a forward or backward direction.

2. The device of claim 1, wherein the collecting device supports the soft insert.

3. The device of claim 1, wherein the collecting device is a round or rectangular-shaped "catcher" made of plastic.

4. The device of claim 1, further comprising a coaster element having the same shape as the collecting device and wherein the collecting device is inserted into the coaster element.

5. The device of claim 1, further comprising a lid attachable to the collecting device.

6. The device of claim 1, wherein the leash and the collecting device are lowered so that the collecting device is on the ground in response to the same command.

7. The device of claim 6, wherein the collecting device moves forward only once the leash touches the ground in a location where the collecting device is located.

8. The device of claim 6, wherein the collecting device is always located above the cord and moves only along a central axis of the cord.

9. The device of claim 6, wherein the cord is connected to a harness of the dog.

10. The device of claim 1, wherein at least the inserts used in the collecting device are made from a biodegradable material.

11. The device of claim 1, wherein the collecting device stops movement along the guiding rod once the limiter is reached.

12. A canine feces catching device for removal of excrement, the device including:
   a leash that includes an extendable cord;
   a radio controller within the leash for control of the feces catching device;
   a button on the leash for operation of the radio controller;
   a collecting device that moves in a forward and backward direction in response to a signal from the radio controller;
   a platform formed as either as a widened part of the extendable cord or as a separate wider element supported by the leash;
   the collecting device being supported by the platform and configured to move along the platform and to stop at a predetermined location;
   a soft insert for the collecting device;
   a movement stopper that limits movement of the device along the platform; and
   a guiding rod for positioning the collecting device on the platform in the forward or backward direction.

\* \* \* \* \*